United States Patent Office 3,387,361
Patented June 11, 1968

3,387,361
METHOD OF CONSTRUCTING THE STATOR FOR A SINGLE PHASE INDUCTION MOTOR
Eric Rowland and Edward William Wilkins, Swindon, England, assignors to Garrard Engineering Limited (formerly The Garrard Engineering and Manufacturing Company Limited), Swindon, England, a British company
Continuation-in-part of application Ser. No. 181,097, Mar. 20, 1962. This application Jan. 26, 1965, Ser. No. 428,042
Claims priority, application Great Britain, Apr. 6, 1961, 12,341/61
2 Claims. (Cl. 29—596)

ABSTRACT OF THE DISCLOSURE

A method of constructing a stator for a single phase induction motor. This method includes the steps of manufacturing a pair of separate paramagnetic metal stator members with configurations which give one of these stator members a generally U-shape with a bight having a pair of side legs extending therefrom, and the other stator member a generally T-shape with a head having a central leg extending therefrom, and with the free ends of the legs and the inner edges of the bight and head having complementary interlocking formations. This manufacturing step also includes providing at one edge of the central leg and at the inner edge of one side leg configurations which conjointly define, when the stator members are assembled, a substantially cylindrical stator tunnel completely closed laterally by paramagnetic metal. The method further includes positioning at least one starting winding on one of the legs adjacent the free end thereof and in embracing relation therewith before assembling the pair of stator members, and then assembling the pair of members by relative movement thereof parallel to the axis of the tunnel to interlock the formations and to retain the starting winding against displacement.

---

This invention relates to single phase induction motors, and is a continuation-in-part of our copending application Ser. No. 181,097, entitled "Single Phase Induction Motor," filed Mar. 20, 1962, and now Patent No. 3,196,303.

The invention is concerned more particularly with a method of constructing the stator for a motor of the shaded pole type in which the stator is provided with a permanently short-circuited winding, usually in the form of a copper band, inclined at an electrical angle with respect to the main stator winding in order to provide a torque for starting the motor when first switched on.

It is an object to provide an improved method of constructing the stator for a motor of this type in which the assembly of the short-circuited winding on the stator is facilitated.

According to the invention, the method comprises the steps of forming a pair of separate paramagnetic metal stator members, one member being generally U-shape with a bight having a pair of side legs extending therefrom, and the other member being generally T-shape with a head having a central leg extending therefrom, the free ends of said legs and the inner edges of said bight and said head being formed with complementary interlocking formations, one edge of said central leg and the inner edge of one side leg being so formed that, when said members are assembled, they conjointly define a substantially cylindrical stator tunnel completely closed laterally by paramagnetic metal, positioning at least one starting winding on one of said legs adjacent the free end thereof and in embracing relation therewith before assembling said pair of members, and assembling said pair of members by relative movement thereof parallel to the axis of said tunnel to interlock said formations and to retain said starting winding against displacement.

Figure 1:
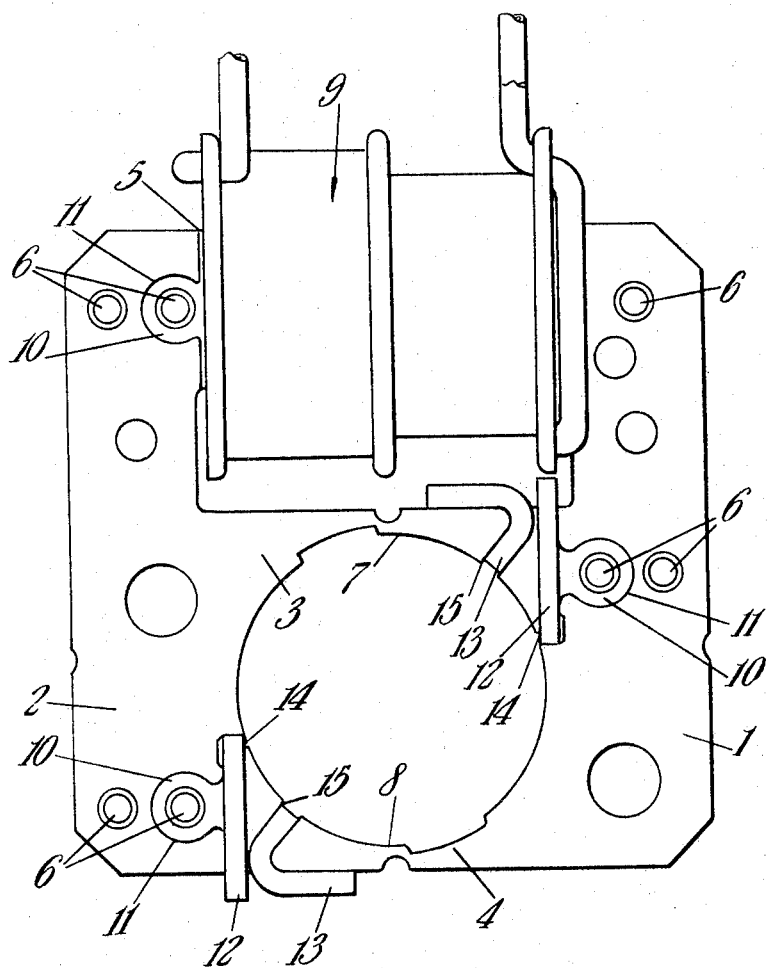
Figure 2:
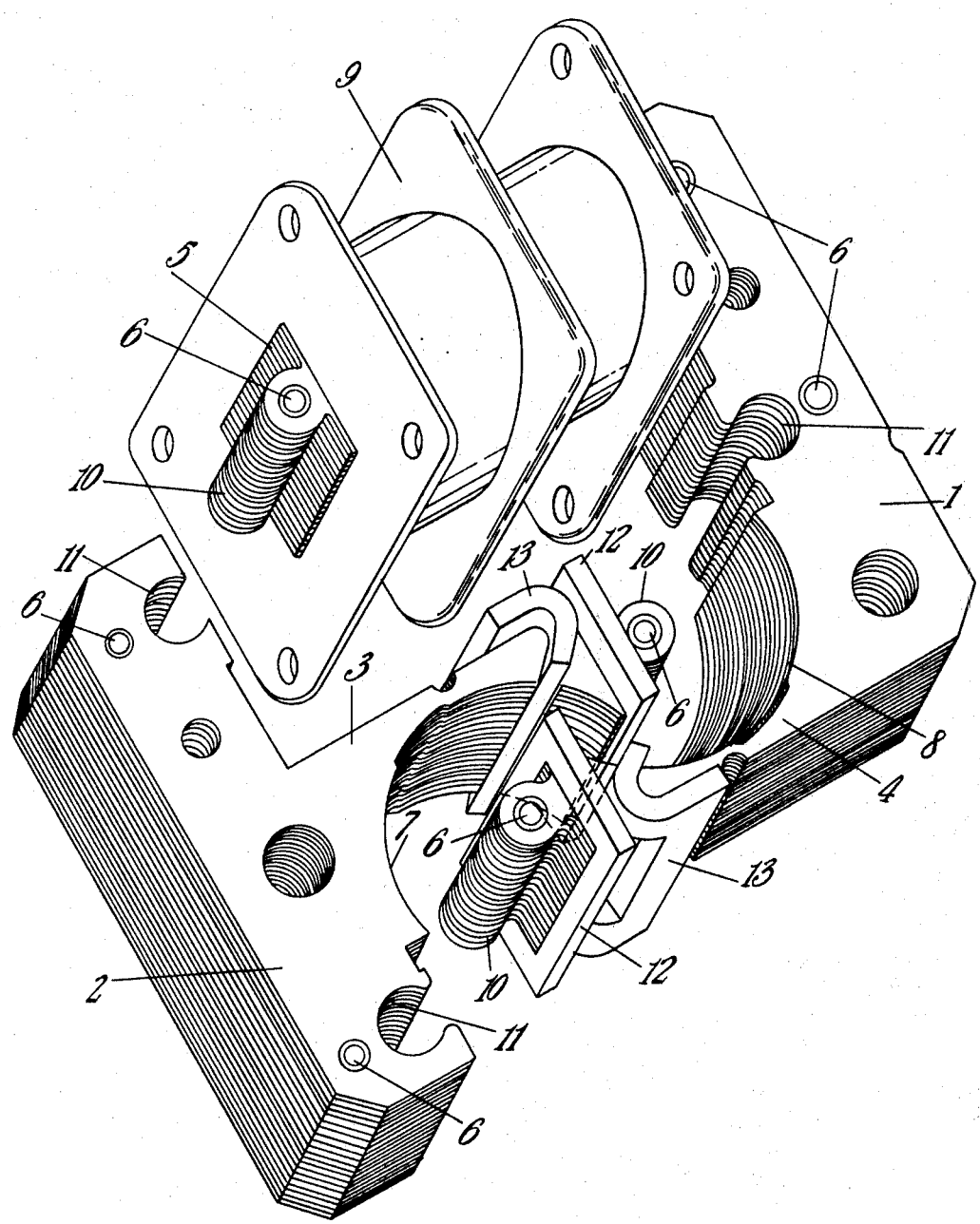

In the accompanying drawings:
FIGURE 1 shows one form of stator constructed according to the method of the present invention, and
FIGURE 2 shows the stator of FIGURE 1 before assembly.

In carrying the invention into effect according to one convenient mode by way of axample, a single phase induction motor is provided with a stator consisting of two interlocked stator members 1 and 2, one member 1 being of generally rectangular U-shape and ther other members 2 being T-shaped. The two members 1 and 2 are arranged with the vertical limb or central leg 3 of the T-shaped member 2 between and spaced from the limbs or side legs 4 and 5 of the U-shaped member 1 so as to define two rectangular magnetic circuits with a common side. Each of these members 1 and 2 is built up from a number of appropriately shaped laminations of paramagnetic metal held together by rivets 6.

One side edge of the central leg 3 of the T-shaped member 2 and the inner side edge of one side leg 4 of the U-shaped member 1 are provided with arcuate cut-away portions 7 and 8 respectively which co-operate to define a generally cylindrical stator tunnel of known configuration. The other side leg 5 of the U-shaped member 1 carries the main excitation winding 9 of the motor.

The free end of each side leg 4 or 5 of the U-shaped stator member 1 and the free end of the central leg 3 of the T-shaped member 2 are formed with a tongue 10 having a part-circular (but greater than semi-circular) cross-section which is constant in the direction of the axis of the stator tunnel.

Each tongue interlocks with a groove 11 of complementary shape formed adjacent the end of the horizontal arm or head of the T-shaped member 2 or at the centre of the bight of the U-shaped member 1.

Alternatively, but not shown, the tongues and grooves may be of dove-tail or other suitable interlocking configuration.

It will be realised that the stator is assembled by arranging one stator member over the other, and then pressing or forcing the two members together so that relative movement between them in the direction of the axis of the stator tunnel causes the two members to lie in the same plane, with the tongues 10 of the members sliding into interlocking relationship in the complementary grooves 11.

However, before the stator is assembled in this fashion, the main excitation winding 9 is located on the side leg 5 of the U-shaped member 1 and copper starting bands 12 and 13, are located on the stator members 1 and 2 in the following manner.

The lower free end, as viewed in FIGURE 1, of the central leg 3 of the T-shaped member 2 and the upper free end of that side leg 4 of the U-shaped member 1 which defines the stator tunnel in part, are grooved or cut away adjacent their tongues 10 to provide end portions of reduced cross-sectional area for accommodating the starting band 12.

Before the two members 1 and 2 are assembled, starting bands 12, each in the form of an endless band punched out of a single piece of material, so as to be without a joint, are located on these end portions, so that when the stator is finally assembled the two starting bands 12 are located at diametrically opposite points on the stator tunnel.

The plane of each starting band 12 is arranged to be tangential to the stator tunnel and the gap 14 between adjacent members 1 and 2 at the surface of the stator tunnel is made as small as possible.

Additional grooves 15 are provided around the periphery of the stator tunnel for accommodating additional starting bands 13 which are positioned in the grooves 15 and then bent flat on their sides remote from the stator tunnel.

The stator constructed in this way may then be provided with a rotor in known manner to provide a single phase induction motor.

Various modifications may be made within the scope of the present invention.

We claim:

1. A method of constructing the stator for a single phase induction motor, said method comprising the steps of manufacturing a pair of separate paramagnetic metal stator members with configurations giving one member a generally U-shape with a bight having a pair of side legs extending therefrom, and the other member a generally T-shape with a head having a central leg extending therefrom, and with the free ends of said legs and the inner edges of said bight and said head having complementary interlocking formations, and said step of manufacturing said stator members including providing at one edge of said central leg and the inner edge of one side leg configurations conjointly defining, when said members are assembled, a substantially cylindrical stator tunnel completely closed laterally by paramagnetic metal, positioning at least one starting winding on one of said legs adjacent the free end thereof and in embracing relation therewith before assembling said pair of members, and assembling said pair of members by relative movement thereof parallel to the axis of said tunnel to interlock said formations and to retain said starting winding against displacement.

2. A method of constructing the stator for a single phase induction motor, as claimed in claim 1, including the step of forming said one leg with a shoulder extending along at least one lateral surface thereof and forming a seat for said starting winding to retain said starting winding against inward displacement along said one leg.

References Cited

UNITED STATES PATENTS

| | | | |
|---|---|---|---|
| 2,064,090 | 12/1936 | Sullivan et al. | 310—172 |
| 2,291,013 | 7/1942 | Wheeler | 336—210 |
| 2,348,003 | 5/1944 | Granfield | 29—155.6 |
| 2,490,209 | 12/1949 | Cornwall | 310—172 |
| 2,815,459 | 12/1957 | Fleckenstein | 310—172 |

CHARLIE T. MOON, *Primary Examiner.*

R. W. CHURCH, *Assistant Examiner.*